United States Patent
Callaghan et al.

[11] 3,856,068
[45] Dec. 24, 1974

[54] TRACTION DEVICE

[76] Inventors: John W. Callaghan; David F. Johnson, both of 215 31st St., both of Boulder, Colo. 80202

[22] Filed: Aug. 2, 1973

[21] Appl. No.: 385,091

[52] U.S. Cl.................. 152/226, 152/190, 152/232
[51] Int. Cl. ......................................... B60c 27/02
[58] Field of Search.... 152/225, 232, 226, 217–219, 152/233, 173, 175, 187, 189, 190

[56] References Cited
UNITED STATES PATENTS

| | | | |
|---|---|---|---|
| 2,352,174 | 6/1944 | Barrows.............................. | 152/226 |
| 2,743,755 | 5/1956 | Fullerton ........................ | 152/225 X |
| 3,002,545 | 10/1961 | Newcomb........................... | 152/223 |

*Primary Examiner*—Stanley H. Tollberg
*Assistant Examiner*—Norman L. Stack, Jr.
*Attorney, Agent, or Firm*—Burton, Crandell & Polumbus

[57] ABSTRACT

A traction device for vehicle wheels having specially formed cross-linked members of resilient material. The cross-link members are each of one piece construction and may conveniently be cut or manufactured from used tire carcasses. The individual cross-links are formed with a generally rectangular central section whose length corresponds to the width of the tire tread. The leading and trailing edges of the central section are concavely curved in a manner such that the cross-links remain flat against the tire and do not twist as they are driven into contact with the road. At each end of the central sections, integral end sections diverge from each other in their extent away from the central section, the end sections being cut from a tire carcass side wall. The distal ends of each end section are sandwiched between, adhesively bonded to and compressively riveted to the end of the end section with portions of the coupling plate projecting outwardly beyond the end. A rivet passing through the two coupling plates is employed to couple each end section to one of a pair of side chains.

4 Claims, 4 Drawing Figures

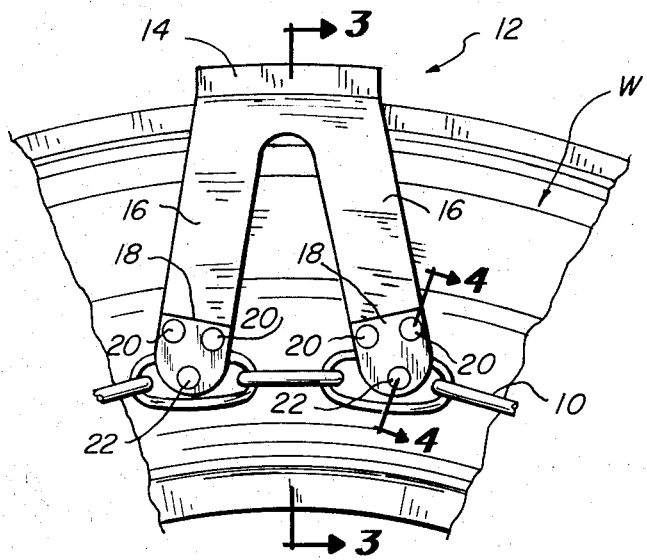
Fig_1
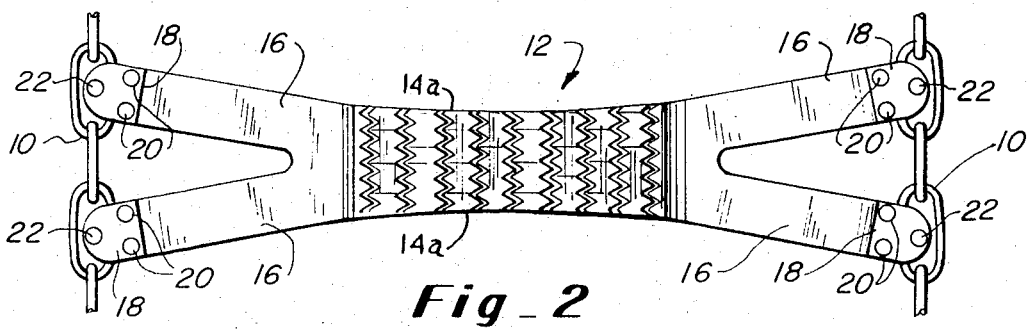
Fig_2
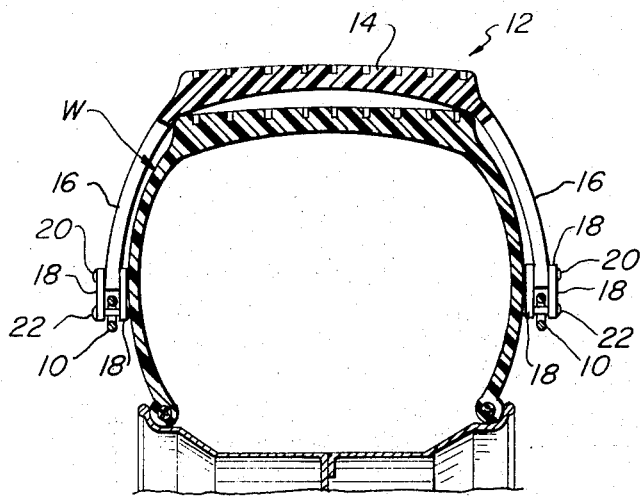
Fig_3
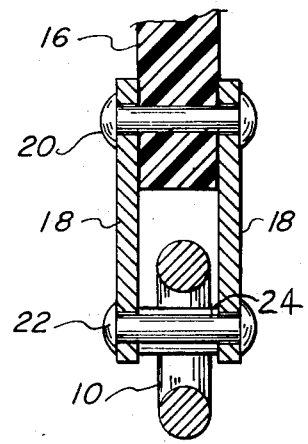
Fig_4

TRACTION DEVICE

BACKGROUND OF THE INVENTION

The present invention is especially designed to provide a removable traction device for use upon vehicle wheels in the same manner as conventional tire chains but which, as compared to the conventional metal chains, will run with relative silence on dry pavement, will minimize wear to the tire when in use, will substantially eliminate undesirable pavement damage, will be substantially lighter in construction and therefore capable of safe operation at higher speeds (approximately twice that heretofore practicable), which can be manufactured at a lower cost, and provides a novel, high strength joint or coupling between the crosslink members and the side chains.

SUMMARY OF THE INVENTION

In the achievement of the foregoing objectives, the "chain" of the present invention is constructed with cross-links cut or formed from used tire carcasses. Each cross-link is formed with a generally rectangular central section whose length is substantially coextensive with the width of the tread of the tire carcass from which the cross-link is cut. At each end of the central section, integral divergent end sections cut from the carcass sidewall are formed and joined at their outer ends by a pair of coupling plates compressively riveted to and adhesively bonded to the end sections, said coupling plates being riveted to circumferentially extending side chains.

Accordingly, a primary object of this invention is to provide a novel traction device for vehicle wheels which may be used at increased vehicle speeds without causing appreciable damage to the road or pavement.

Another object of the invention is to provide a traction chain of a resilient material having cross-links so configured that rolling or twisting of the cross-link as it moves into contact with the road is eliminated.

Another object of this invention is to provide a novel traction device for use upon a vehicle wheel comprising a pair of side chains adapted to extend circumferentially along opposite sides of the vehicle wheel and a plurality of cross-link members secured to and extending transversely between said side chains wherein each of said cross-links includes a one-piece member of resilient material having a generally rectangular central section integrally joined at each of two opposite ends to a pair of end sections, said end sections diverging from each other in their extent away from said central section, a pair of coupling plates adhesively bonded to and riveted to opposite sides or each end section and projecting beyond the end of said end section, and means coupling the projecting portions of said coupling plate to said side chains.

Another object of this invention is to provide a novel traction device as aforesaid wherein the length of said central section between said opposite ends is approximately equal to the transverse width of the ground engaging tread of the vehicle wheel.

Another object of this invention is to provide a novel traction device as aforesaid wherein said one piece member is cut from a vehicle tire with said central portion being constituted by the tread portion of the tire and said end sections being constituted by the side walls of said tire.

Another object of this invention is to provide a novel traction device as aforesaid including a unique, high strength joint intercoupling the cross-link members and the side chains.

Another object of this invention is to provide a novel traction device as aforesaid in which the aforementioned joint includes the distal ends of each end section sandwiched between and adhesively bonded to and compressibly riveted to the end of the end section with portions of the coupling plate projecting outwardly beyond the end.

Another object of this invention is to provide a novel traction device including cross-link members each of which are lighter in construction than prior art cross-link members.

Another object of this invention is to provide a novel traction device in which the cross-link members are formed from a non-metallic material and wherein said device has an increased operating life.

Other objects and features of the invention will become apparent by reference to the following specification and to the drawings.

IN THE DRAWINGS

FIG. 1 is a partial side view of a vehicle wheel having a traction device embodying the present invention mounted thereon;

FIG. 2 is a top plan view of a portion of the traction device;

FIG. 3 is a cross-sectional view taken on line 3—3 of FIG. 1;

FIG. 4 is a detail cross-sectional view taken on line 4—4 of FIG. 1;

In FIG. 1, there is shown a fragmentary side elevation of a traction device embodying the present invention and placed upon a rubber tire vehicle wheel designated generally W. The device includes a pair of generally circular side chains 10 each of which extends circumferentially of the wheel when mounted, the chains 10 being provided with a conventional coupling link, not shown, for joining their opposite ends. A plurality of cross links designated generally 12 are secured to and extend transversely between side chains 10, as best seen in FIG. 2. Side links 12 are formed in one piece from a resilient, non-metallic material and are preferably cut from used tire carcasses.

Each side link 12 includes a generally rectangular central section 14 whose length is substantially equal to the width of the tread of the wheel upon which the traction device is to be mounted. In the usual case where links 12 are formed from used tire carcasses, the carcass from which the links are cut is chosen to be a tire of substantially the same or next larger size as that to which the traction device is to be applied, and hence, normally central section 14 will extend substantially entirely across the tread portion of the tire carcass.

The leading and trailing edges 14a of the central section are not straight, but are formed with a smooth concave curvature so that as the link moves into contact with the road, contact is first made near the opposite ends of the link and then progressively toward the center. This creates a pressure force which tends to transversely rigidify the link to resist rolling or twisting of the link upon contact with the road.

From each end of central section 14, a pair of outwardly divergent end sections 16 project, end sections 16 being cut from the side wall of the tire carcass.

In forming cross links 12 from a used tire carcass, the mounting beads are first cut from the tire carcass because these beads are usually reinforced with a metal strip, and their removal enables the cross links to be cut from the carcass in a stamping operation. As indicated in FIGS. 1 and 3, it is not necessary, and in fact undesirable, that the end sections 16 extend completely across the side wall of the tire on which they are mounted. Preferably, the tire carcass employed for making cross links 12 will have a tread depth or thickness or approximately three-eighths inch or more to give a sufficient bite into snow or mud.

The outer ends of each end section 16 are sandwiched between a pair of coupling plates 18 as best seen in FIGS. 3 and 4, the plates 18 being adhesively bonded to the opposite sides of end section 16 and further compressively secured (approximately 2,000 pounds of compression has been found to be adequate) to the end sections by a pair of rivets 20 passing through both plates and the end section. Plates 18 are mounted upon end section 16 so that the plates project outwardly beyond the outer end of the end section and a third rivet 22 passing through the both plates 18, a plate spacer 24 and a link of chain 10 is employed to couple the end section to side chains 10.

The number of cross links 10 employed on a given wheel may vary with the diameter or size of the wheel upon which the device is to be mounted. In general, depending upon the size of the tire carcass from which the cross links are cut, approximately eight to 20 cross links will be obtained from each carcass and in the usual case a tire carcass of the same size as the wheel upon which the traction device is to be mounted will furnish the desired number of cross links.

Because of the fact that the only road contacting portions of the traction device are formed from vehicle tires, the device when installed runs much more smoothly and quietly on dry pavement than do conventional metal tire chains and, further, is acceptable for use in those areas where studded tires or steel chains are prohibited by statute. The rubber cross links are substantially lighter in weight than those of steel chains, thus permitting higher vehicle speeds than steel chains can be safely operated. More specifically, the rubber cross link members are about one-half the weight of the corresponding metal links used in metal tire chains. Tests have shown that the traction available from the device of the present invention is approximately the same as that available from steel chains while greatly exceeding the traction afforded by conventional snow tires. The concave leading edge 14a of the cross-link inhibits rolling or twisting of the link under the tire as the tire moves into contact with the road, thus increasing the service life of the device.

From the foregoing, it will now be appreciated that a novel traction device has been disclosed and shown. The traction device of this invention permits a vehicle to be operated at speeds up to 45 miles per hour as contrasted with vehicle speeds of up to about 25 miles per hour for metal tire chains. It will also be understood that increased traction is obtained with a traction device of this invention since a larger cross-sectional area of the cross-link is maintained in contact with the road surface as compared with metal tire chains. Additionally, since the cross-link member is formed from a material low in abrasiveness, the traction device of this invention has an increased operating life as compared with that of metal tire chains.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claims.

We claim:

1. In a traction device for use upon a vehicle wheel comprising connecting means adapted to extend circumferentially along opposite sides of the vehicle wheel and a plurality of cross link members secured to and extending transversely between said connecting means; the improvement wherein each of said cross links comprises a one piece member of resilient material having a generally rectangular central section having concavely curved leading and trailing edges and integrally joined at each of two opposite ends to a pair of end sections, said end sections diverging from each other in their extent away from said central section, means including a pair of coupling plates mounted on opposite sides of each end section and projecting beyond the end of said end sections, means for compressively mounting said coupling plates on opposite sides of each said end section, and means coupling the projecting portions of said coupling plates to said side chains.

2. The invention defined in claim 1 wherein the length of said central section between said opposite ends is approximately equal to the transverse width of the ground engaging tread of the vehicle wheel.

3. The invention defined in claim 2 wherein said one piece member is cut from a vehicle tire with said central portion being constituted by the tread portion of the tire and said end sections being constituted by the sidewalls of said tire.

4. The invention defined in claim 1 including means for adhesively bonding said coupling plates on opposite sides of each said end section.

* * * * *